United States Patent
Emery

(10) Patent No.: US 8,278,795 B2
(45) Date of Patent: Oct. 2, 2012

(54) VOLTAGE GRADING STRUCTURE IN A HIGH-VOLTAGE STATOR COIL OF AN ELECTROMOTIVE MACHINE

(75) Inventor: Franklin T. Emery, Eighty Four, PA (US)

(73) Assignee: Siemens Energy, Inc., Orlando, FL (US)

( * ) Notice: Subject to any disclaimer, the term of this patent is extended or adjusted under 35 U.S.C. 154(b) by 384 days.

(21) Appl. No.: 12/562,203

(22) Filed: Sep. 18, 2009

(65) Prior Publication Data
US 2011/0068643 A1    Mar. 24, 2011

(51) Int. Cl.
*H02K 3/40*    (2006.01)

(52) U.S. Cl. .......... 310/201; 310/196

(58) Field of Classification Search ............ 310/201, 310/196
See application file for complete search history.

(56) References Cited

U.S. PATENT DOCUMENTS

| | | | | |
|---|---|---|---|---|
| 3,158,770 | A | * | 11/1964 | Coggeshall et al. .......... 310/214 |
| 4,698,756 | A | * | 10/1987 | Gonzalez et al. ............ 702/130 |
| 5,175,396 | A | * | 12/1992 | Emery et al. ............... 174/36 |
| 5,323,079 | A | * | 6/1994 | Nieves et al. ............... 310/213 |
| 5,408,152 | A | * | 4/1995 | Finnerty et al. ............. 310/54 |
| 5,633,477 | A | * | 5/1997 | Smith et al. ............ 174/138 E |
| 6,228,494 | B1 | | 5/2001 | Emery |
| 6,361,632 | B1 | | 3/2002 | Emery |
| 6,420,812 | B1 | * | 7/2002 | Emery ..................... 310/196 |
| 6,498,415 | B1 | * | 12/2002 | Emery ..................... 310/196 |
| 6,559,384 | B1 | | 5/2003 | Angell et al. |
| 6,624,547 | B1 | | 9/2003 | Emery |
| 6,660,940 | B1 | | 12/2003 | Emery |
| 6,724,118 | B2 | | 4/2004 | Emery |
| 6,768,240 | B2 | * | 7/2004 | Younsi et al. ............. 310/201 |
| 6,827,805 | B2 | | 12/2004 | Angell et al. |
| 7,088,020 | B2 | * | 8/2006 | Holly et al. ............... 310/52 |
| 7,391,141 | B2 | | 6/2008 | Emery et al. |
| 2003/0141775 | A1 | * | 7/2003 | Younsi et al. ............. 310/201 |
| 2004/0189109 | A1 | * | 9/2004 | Holly et al. ............... 310/52 |
| 2005/0029893 | A1 | * | 2/2005 | Baumann et al. ........... 310/201 |
| 2006/0214530 | A1 | * | 9/2006 | Emery et al. ............. 310/213 |
| 2007/0114052 | A1 | * | 5/2007 | Emery ..................... 174/36 |
| 2008/0236865 | A1 | | 10/2008 | Emery et al. |
| 2009/0127944 | A1 | * | 5/2009 | Tartaglione ............... 310/61 |

FOREIGN PATENT DOCUMENTS

| | | |
|---|---|---|
| DE | 19536209 A1 | 12/1996 |
| EP | 1443628 A2 * | 8/2004 |
| WO | WO 2008087093 A1 * | 7/2008 |
| WO | 2009081430 A2 | 7/2009 |

OTHER PUBLICATIONS

Translation of foreign document DE 19536209.*

* cited by examiner

*Primary Examiner* — Quyen Leung
*Assistant Examiner* — Alex W Mok

(57) ABSTRACT

A voltage grading structure (40) as may be used in the stator coils of an electromotive machine is provided. A filler material (44) may be disposed on a top surface and a bottom surface of a stack of coil strands (22). The voltage grading structure may include an electrical isolation layer (46) on the filler material and may further include an electrically conductive layer (48) on the electrical isolation layer. An electrically conductive bar (50) is positioned on the electrically conductive layer. The conductive bar is electrically connected to at least one of the coil strands (22) to shunt a capacitance effect between the conductive layer and the stack of coil strands and force the conductive layer to be substantially at a common voltage level relative to the stack of coil strands and thereby avoid an overvoltage condition.

20 Claims, 2 Drawing Sheets

VOLTAGE GRADING STRUCTURE IN A HIGH-VOLTAGE STATOR COIL OF AN ELECTROMOTIVE MACHINE

FIELD OF THE INVENTION

The present invention is generally related to electromotive machines including high-voltage stator coils, and more particularly to structural arrangements for grading voltages in the stator coils of such machines.

BACKGROUND OF THE INVENTION

Generally, electromotive machines have a rotor and a stator. The rotor is wound with field windings, which are disposed in slots in the body of the rotor. The stator is wound with stator coils, which are disposed in slots in the body of the stator. In the case of a generator machine, when the rotor is rotated by an external source of mechanical energy, such as a steam turbine or a gas turbine, and an excitation current is provided to the field windings, electrical energy is induced in the stator coils.

Stator coils are generally constructed from a plurality of individual conductors referred to as strands. The strands are stacked together to form a larger conductor (or coil) capable of carrying high voltages and currents. In many stator coils, the strands are twisted into a weaved pattern rather than simply being stacked one on top of another. This weaving technique is generally referred to in the art as Roebelling and helps prevent the inner strands of a stator coil, which are closest to the rotor, from carrying more current (and generating more heat) than the outer strands, which are further from the rotor. Roebelling helps ensure that each strand carries a similar amount of current and generates a similar amount of heat.

Some stator coils include integral vent tubes to cool the strands. These types of stator coils are referred to in the art as inner-cooled coils. In inner-cooled coils, a plurality of vent tubes may be stacked on top of one another and sandwiched between two or more stacks of strands. A cooling gas (e.g., hydrogen or air) is then pumped through the vent tubes to transfer heat away from the strands.

There are a number of challenges associated with manufacturing inner-cooled stator coils. For example, after a stack of strands has been Roebelled, the top and bottom surfaces of the stack are no longer smooth. The surfaces have significant discontinuities caused by the Roebelling of the strands. These discontinuities make it difficult to apply an outer layer of insulation, referred to as ground-wall insulation.

Another challenge may be that a relatively large voltage differential can develop between the strands and the vent tubes in a stator coil while a generator is operating. If this voltage differential exceeds the dielectric strength of the insulation between the strands and the vent tubes, an electrical short will occur between the copper strands and the vent tubes, which can lead to circulating currents in the vent tubes and/or catastrophic damage to the stator coil.

Although various techniques have been proposed to alleviate such challenges, there is still a need for further improvements in stator coil configurations that provide increased protection against electrical shorts and an ability to grade voltages present in the stator coil to avoid overvoltage conditions that could lead to electrical discharge activity during operation of the electromotive machine, while also reducing the complexity and costs associated with manufacturing stator coils.

BRIEF DESCRIPTION OF THE DRAWINGS

The invention is explained in the following description in view of the drawings that show.

DETAILED DESCRIPTION OF THE INVENTION

Figure 1:
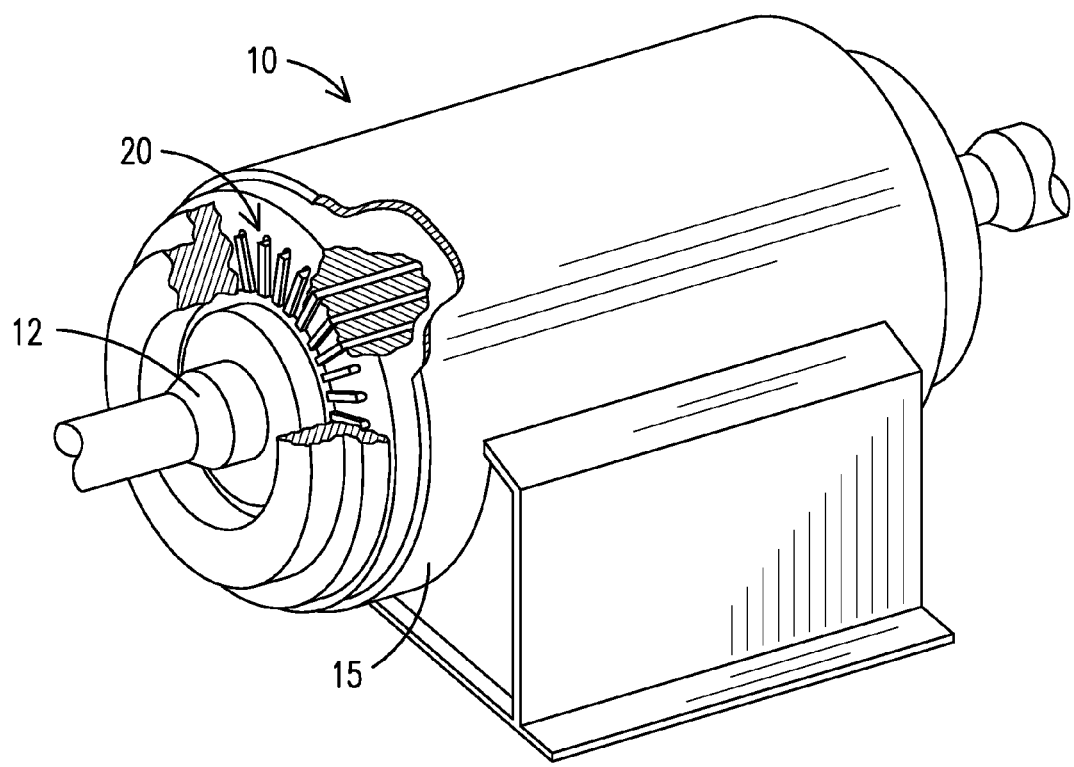
FIG. 1 is a fragmentary perspective view of an example electromotive machine showing a plurality of stator coils embodying aspects of the present invention.

FIG. 1 illustrates an example electromotive machine 10 (e.g., a generator or a motor) that can benefit from aspects of the present invention. Machine 10 comprises a rotor 12 and a stator 15 positioned to surround the rotor 12, as will be understood by one skilled in the art. The stator 15 includes a plurality of high-voltage (e.g., approximately ≧4 kV) stator coils 20, illustrated in greater detail in FIG. 2. Each of the plurality of stator coils 20 includes one or more stacks of coil strands 22, e.g., formed of copper or a copper alloy, and a plurality of metal vent tubes 30 which conduct a cooling gas, such as hydrogen or air. In accordance with aspects of the present invention, a respective voltage grading structural arrangement is internally constructed in the stator coil at the top and bottom surfaces of the stack of coil strands for grading voltages, thereby preventing overvoltage conditions that could lead to electrical discharge activity during operation of the electromotive machine.

Figure 2:
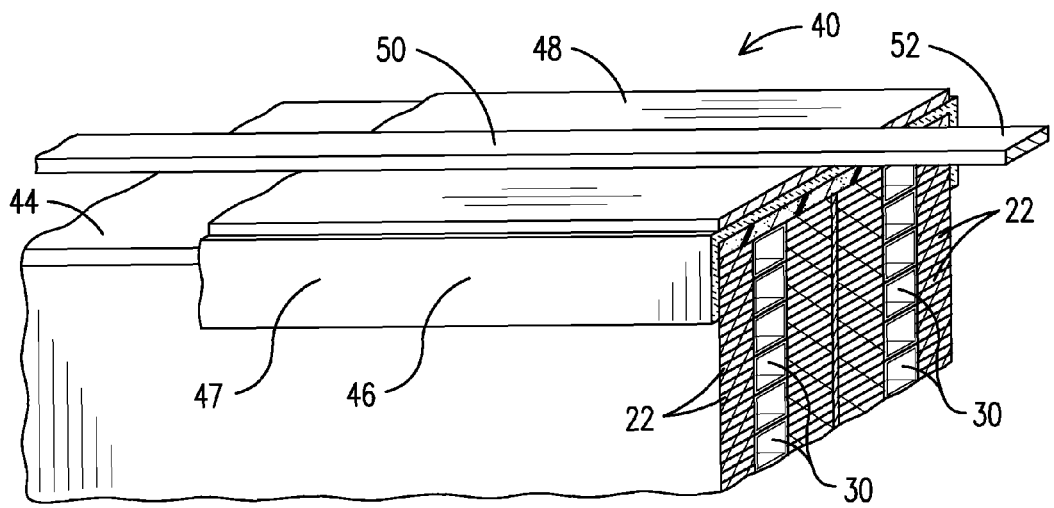
FIG. 2 is a fragmentary perspective view of an example stator coil having a voltage grading arrangement according to aspects of the present invention.
Figure 3:
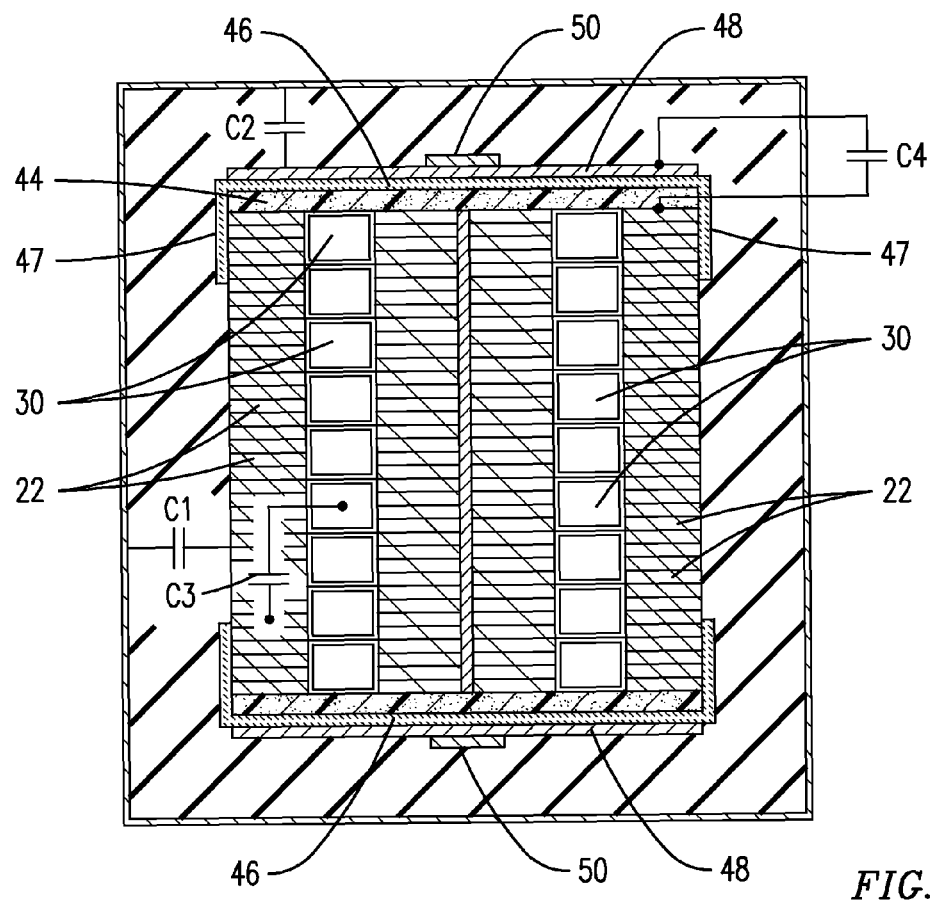
FIG. 3 is a cross sectional view showing intrinsic impedances between stator coil components.

FIG. 2 shows an example embodiment of a voltage grading arrangement 40 in accordance with aspects of the present invention. For simplicity of illustration, FIG. 2 shows the voltage grading arrangement just in connection with a top surface of the stack of coil strands. It will be appreciated, however, that an identical arrangement is provided at the bottom surface of the stack of coil strands, as shown in FIG. 3. Voltage grading arrangement 40 comprises a filler material 44, e.g., a Roebell filler comprising a resin-impregnated felt, such as may be made from Nomex® aramid fiber or Dacron® polyester fiber, each available from E.I. Du Pont de Nemours & Co., Inc. As will be understood by one skilled in the art, filler material 44 substantially smoothes the top and bottom surface discontinuities that typically result due to the Roebelling (weaving) of the strands.

An electrical isolation layer 46 is disposed over filler material 44. In one example embodiment, isolation layer 46 may be a layer of glass-backed mica tape and may be configured to extend along the width of the coil. Isolation layer 46 may be further configured to provide a respective lateral extension 47 (e.g., having a length ranging from approximately 0.25 inch to approximately 1 inch in one example embodiment) on each side of the stack of coil strands.

An electrically conductive layer 48 is disposed over isolation layer 46. In one example embodiment, conductive layer 48 may be a carbon-filled conductive tape and the glass-backed side of isolation layer 46 may be positioned against conductive layer 48. In one example embodiment, electrically conductive layer 48 substantially extends over a straight region of the coil. That is, electrically conductive layer 48 need not extend over involute regions of the coil respectively located at the front and at the rear sections of the coil. Due to spacing constraints, electrical isolation layer 46 and conductive tape layer 48 each comprises a relatively small thickness (approximately ranging from approximately 0.005 inch to approximately 0.006 inch thickness in one example embodiment).

An electrically conductive bar 50 is disposed over conductive layer 48. Conductive bar 50 may be constructed of any electrically conductive material, such as copper or any other suitable electrically conductive metal or metal alloy. One end (e.g., end 52) of conductive bar is sufficiently long to be electrically connected to at least one of the strands by any suitable affixing technique, such as welding, brazing, or soldering. The opposite end may be electrically floating. Approximately ¼ square inch of the strand's surface may be stripped of insulation to facilitate the electrical connection.

The conductive layer 48 advantageously functions as an electrical shield to reduce voltages that could develop across voids (e.g., trapped air bubbles) that may form in Roebell filler 44 and tend to overcome the dielectric properties of Roebell filler 44. For example, as will be readily understood by one skilled in the art, Roebell filler 44 for bonding purposes may be subject to a bakelize process while exposed to air, and this can lead to the trapping of air bubbles in Roebel filler 44. Electrical isolation layer 46 is arranged with respect to electrically conductive layer 48 to avoid formation of electrical interconnections by way of conductive layer 48 in the coil strands 22 and/or the vent tubes 30, thereby preventing electrical shorts between the cool strands and/or the vent tubes. For example, inter-strand insulation and vent tube insulation may be relatively porous and, in the absence of electrical isolation layer 46, conductive layer 48 could establish an inter-strand electrical connection that could lead to strand-to-strand electrical shorts and/or could establish electrical shorts in the vent tubes. Thus, the presence of electrical isolation layer 46 advantageously avoids conductive layer 48 from causing strand-to-strand electrical shorts and/or electrical shorts in, the vent tubes while maintaining the ability of conductive layer 48 to effectively function as an electric shield with respect to the coil strands and/or the vent tubes to reduce voltages that could develop across voids that can be formed in Roebel filler 44.

Conductive bar 50 electrically connects conductive layer 48 to at least one coil strand 22 and essentially forces conductive layer 48 to be substantially at a common voltage level relative to the stack of coil strands the coil strands 22. In one example embodiment, strips of adhesive tape (e.g., strips of Nomex® adhesive tape) may be used to hold conductive bar 50 in position. Additionally, conductive bar 50 may be further secured upon applying a layer of groundwall insulation to the coil.

FIG. 3 is a cross sectional view including intrinsic impedances between coil components. Capacitance C1 represents a groundwall capacitance. Capacitance C2 represents a capacitance between an outer conductive electrode of the coil and conductive layer 48. Capacitance C3 represents capacitance between metal vent tubes 30 and coil strands 22. Capacitance C4 represents capacitance between coil strands 22 and conductive layer 48. (e.g., Roebel filler capacitance).

Figure 4:
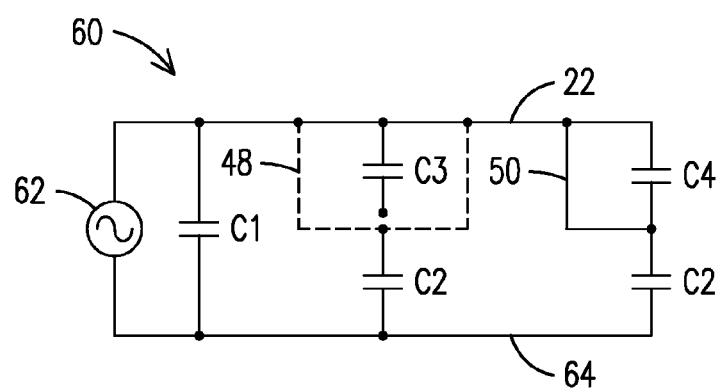
FIG. 4 illustrates an equivalent circuit of a stator coil having a voltage grading arrangement embodying aspects of the present invention.

FIG. 4 illustrates an equivalent circuit 60 of a stator coil having a voltage grading arrangement embodying aspects of the present invention. As shown in FIG. 4, conductive bar 50 shunts a capacitance effect between conductive layer 48 and the stack of coil strands 22 and forces conductive layer 48 to be substantially at a common voltage level relative to the stack of coil strands and thereby avoid an overvoltage condition. This allows removing the effects of a voltage that could otherwise develop across capacitance C4 (i.e., the Roebel filler capacitance). Alternating current (AC) source 62 represents an AC voltage generated by the stator coil between the copper strands 22 and a coil outer conducting electrode 64.

In operation, an internally-constructed voltage grading arrangement embodying aspects of the present invention is believed to provide at least the following example advantages:

reduced thickness for the Roebel filler, which in turn allows a relatively thicker groundwall insulation. The reduced thickness is further conducive to improved coil impregnation by the filler;

maintains high inter-strand electrical resistance so that the stator coils can reliably meet applicable electrical isolation requirements;

improves acceptance rates of the stator coils when subjected to power factor tip-up tests. For readers desirous of general background information regarding power factor tip-up tests, reference is made to IEEE standard 286-2000, titled "IEEE Recommended Practice for Measurement of Power Factor Tip-Up of Electric Machinery Stator Coil Insulation", which is incorporated herein by reference; and/or eliminates the need of external voltage grading resistors, which generally require a substantial number of burdensome and costly soldering connections.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. An electromotive machine comprising:
a rotor;
a stator operatively coupled to the rotor, the stator including at least one high voltage stator coil comprising:
a plurality of coil strands arranged to form a stack of coil strands;
a plurality of vent tubes arranged to pass a cooling gas to cool the stack of coil strands;
a filler material disposed on a top surface and a bottom surface of the stack of coil strands;
a voltage grading structure comprising a first voltage grading structure arranged by the top surface of the stack of coil strands, the voltage grading structure further comprising a second voltage grading structure arranged by the bottom surface of the stack of coil strands, wherein the first and second voltage grading structures comprise spaced-apart structures relative to one another, each voltage grading structure comprising:
an electrical isolation layer on the filler material;
an electrically conductive layer on the electrical isolation layer; and
an electrically conductive bar positioned on the electrically conductive layer, the conductive bar electrically connected to at least one of the coil strands to shunt a capacitance effect between the conductive layer and the stack of coil strands and force the conductive layer to be substantially at a common voltage level relative to the stack of coil strands and thereby avoid an overvoltage condition.

2. The electromotive machine of claim 1, wherein the electrical isolation layer is arranged with respect to the electrically conductive layer to avoid formation of electrical interconnections by way of the conductive layer in the coil strands and/or the vent tubes, thereby preventing electrical shorts between the coil strands and/or the vent tubes.

3. The electromotive machine of claim 1, wherein the conductive layer is arranged to form an electric shield with respect to the coil strands and/or the vent tubes.

4. The electromotive machine of claim 1, wherein the electrical isolation layer comprises a layer of a glass-backed mica tape.

5. The electromotive machine of claim 4, wherein the electrical isolation layer comprises a thickness ranging from approximately 0.005 inch to approximately 0.006 inch.

6. The electromotive machine of claim 1, wherein the electrically conductive layer comprises a layer of a carbon-filled conductive tape.

7. The electromotive machine of claim 6, wherein the electrically conductive layer comprises a thickness ranging from approximately 0.005 inch to approximately 0.006 inch.

8. The electromotive machine of claim 1, wherein the conductive bar comprises a metal bar.

9. The electromotive machine of claim 1, wherein the filler material is arranged to smooth discontinuities at the top and bottom surfaces of the stack of coil strands.

10. The electromotive machine of claim 1, wherein the filler material comprises a resin-impregnated fiber, and wherein said fiber is selected from the group consisting of an aramid fiber and a polyester fiber.

11. A high-voltage stator coil comprising:
a plurality of coil strands arranged to form a stack of coil strands;
a plurality of vent tubes arranged to pass a cooling gas to cool the stack of coil strands;
a filler material disposed on a top surface and a bottom surface of the stack of coil strands;
a voltage grading structure comprising a first voltage grading structure arranged by the top surface of the stack of coil strands, the voltage grading structure further comprising a second voltage grading structure arranged by the bottom surface of the stack of coil strands, wherein the first and second voltage grading structures comprise spaced-apart structures relative to one another, each voltage grading structure comprising:
an electrical isolation layer on the filler material;
an electrically conductive layer on the electrical isolation layer; and
a conductive bar positioned on the electrically conductive layer, the conductive bar electrically connected to at least one of the coil strands to shunt a capacitance effect between the conductive layer and the stack of coil strands and force the conductive layer to be substantially at a common voltage level relative to the stack of coil strands and thereby avoid an overvoltage condition.

12. The stator coil of claim 11, wherein the electrical isolation layer is arranged with respect to the electrically conductive layer to avoid formation of electrical interconnections by way of the conductive layer in the coil strands and/or the vent tubes, thereby preventing electrical shorts between the coil strands and/or the vent tubes.

13. The stator coil of claim 11, wherein the conductive layer is arranged to form an electric shield with respect to the coil strands and/or the vent tubes.

14. The stator coil of claim 11, wherein the electrical isolation layer comprises a layer of a glass-backed mica tape and the electrically conductive layer comprises a layer of a carbon-filled conductive tape, each tape having a thickness ranging from approximately 0.005 inch to approximately 0.006 inch.

15. The stator coil of claim 11, wherein the filler material is arranged to smooth discontinuities at the top and bottom surfaces of the stack of coil strands and comprises a resin-impregnated fiber selected from the group consisting of an aramid fiber and a polyester fiber.

16. A voltage grading structure for a high-voltage stator coil comprising a plurality of coil strands arranged to form a stack of coil strands, the stator coil further comprising a plurality of vent tubes arranged to pass a cooling gas to cool the stack of coil strands, and a filler material disposed on a top surface and a bottom surface of the stack of coil strands, the voltage grading structure comprising a first voltage grading structure arranged by the top surface of the stack of coil strands, the voltage grading structure further comprising a second voltage grading structure arranged by the bottom surface of the stack of coil strands, wherein the first and second voltage grading structures comprise spaced-apart structures relative to one another, each voltage grading structure comprising:
an electrical isolation layer on the filler material;
an electrically conductive layer on the electrical isolation layer; and
a conductive bar positioned on the electrically conductive layer, the conductive bar electrically connected to at least one of the coil strands to shunt a capacitance effect between the conductive layer and the stack of coil strands and force the conductive layer to be substantially at a common voltage level relative to the stack of coil strands and thereby avoid an overvoltage condition.

17. The voltage grading structure of claim 16, wherein the electrical isolation layer is arranged with respect to the electrically conductive layer to avoid formation of electrical interconnections by way of the conductive layer in the coil strands and/or the vent tubes, thereby preventing electrical shorts between the coil strands and/or the vent tubes.

18. The voltage grading structure of claim 16, wherein the conductive layer is arranged to form an electric shield with respect to the coil strands and/or the vent tubes.

19. The voltage grading structure of claim 16, wherein the electrical isolation layer comprises a layer of a glass-backed mica tape, the electrically conductive layer comprises a layer of a carbon-filled conductive tape, each tape having a thickness ranging from approximately 0.005 inch to approximately 0.006 inch.

20. The voltage grading structure of claim 16, wherein the filler material is arranged to smooth discontinuities at the top and bottom surfaces of the stack of coil strands and comprises a resin-impregnated fiber, wherein said fiber is selected from the group consisting of an aramid fiber and a polyester fiber.

* * * * *